United States Patent Office 3,332,989
Patented July 25, 1967

3,332,989
PROCESS OF PREPARING ALKARYL SULFONATES BY DIMERIZING OLEFINS WITH A METAL OXIDE PROMOTED SILICA-ALUMINA CATALYST

Joseph Q. Snyder, St. Charles, and Robert D. Swisher, Kirkwood, Mo., William E. Weesner, Dayton, Ohio, and Lionel T. Wolford, Endwell, N.Y., assignors to Monsanto Company, St. Louis, Mo., a corporation of Delaware
No Drawing. Filed Feb. 23, 1965, Ser. No. 434,624
8 Claims. (Cl. 260—505)

The present invention relates to a process for the preparation of alkyl aromatic sulfonates. More particularly, the present invention relates to a process for the preparation of olefin hydrocarbons and their incorporation into alkyl aromatic sulfonate compositions. Still more particularly, the present invention relates to a process for the ultimate production of alkyl aromatic sulfonate compositions having the property of being susceptible to biological decomposition.

At present, the majority of the commercially available detergents contain alkylbenzene sulfonates or other alkyl aromatic sulfonates as the active ingredient. These alkylbenzene sulfonates, though having excellent detergent properties, are highly resistant to biological oxidation or, as otherwise known, biodegradation. Because of this resistance to decomposition by biological means, considerable amounts of these detergent compounds pass through sewage or waste disposal plants unchanged. The presence of the undecomposed detergent causes difficulty in operating the disposal plants and further, after leaving the disposal plants, is responsible for unsightly nuisances and represents potential toxicity hazards to aquatic life and to communities downstream. This problem is receiving rapidly increasing attention from public health officials, sanitary engineers and the detergent industry. In several countries of Europe, the problem has become so acute as to inspire governmental action relative to the control of the manufacture of alkylbenzene sulfonate detergents.

The alkylbenzene sulfonates presently used in the detergent industry, to a large extent derive their alkyl substituents from olefin polymers, with the most commonly used polymers being propylene tetramers, pentamers, and fractions intermediate between these two. These propylene-derived polymers are produced largely by the polymerization of propylene over phosphoric acid catalysts. The alkylbenzene sulfonates prepared from these phosphoric acid polymerization products are, as are those prepared from many other such olefin polymers, highly resistant to biological oxidation.

It is an object of the present invention to provide a process for the polymerization of olefin hydrocarbons. It is also an object of the present invention to provide a process for the preparation of alkyl aromatic sulfonate compositions. Another object of the present invention is to provide a process for the dimerization and/or co-dimerization of straight-chain mono-olefin hydrocarbons. Yet another object of the present invention is to provide a process for the production of olefin polymers which are significantly more susceptible to biological decomposition than those provided by presently known processes. A more particular object of the present invention is to provide a process for the preparation of alkyl aromatic sulfonate detergent compositions which are substantially less resistant to biological decomposition than those presently known, wherein the alkyl substituents to the alkyl aromatic sulfonate are obtained by the dimerization and/or co-dimerization of straight-chain mono-olefin hydrocarbons. Additional objects will become apparent from the following description of the invention herein disclosed.

In fulfillment of these and other objects, it has been found that certain specifically prepared alkyl aromatic sulfonates possess the property of being susceptible to biological decomposition. The process whereby these specifically prepared alkyl aromatic sulfonates are formed comprises contacting a hydrocarbon feed containing at least one straight-chain mono-olefin hydrocarbon of 5 to 12 carbon atoms selected from the group consisting of alpha-olefins and internally unsaturated olefins with a catalyst selected from the group consisting of synthetic silica-alumina, naturally occurring silica-alumina and metal oxide promoted silica-alumina catalyst when said mono-olefin is an internally unsaturated olefin and with a metal oxide promoted silica-alumina when said mono-olefin is an alpha-olefin, at a temperature ranging from 50 to 250° C. and a pressure of atmospheric to 2000 p.s.i., thereby forming a product containing substantial amounts of polymers formed by the condensation of two molecules or monomer units and having a number of carbon atoms equal to the sum of the carbon atoms contained in any two straight-chain mono-olefin hydrocarbon molecules, like or unlike, within the hydrocarbon feed, and thereafter subjecting said product to distillation and recovering therefrom a fraction consisting essentially of the polymers formed by the condensation of two straight-chain mono-olefin molecules and then subjecting said fraction to alkylation conditions in the presence of an aromatic hydrocarbon and a suitable alkylation catalyst, thereby producing alkyl aromatic hydrocarbons containing as the alkyl substituents the polymers formed by the union of two straight-chain mono-olefin molecules, and thereafter subjecting the alkyl aromatic hydrocarbons to sulfonation and subsequent neutralization thereby producing alkyl aromatic sulfonates. The alkyl aromatic sulfonates thus produced are significantly more susceptible to biological decomposition than those of comparable molecular weights produced by presently known methods.

The process of the present invention as disclosed above comprises three critical steps. These three steps are: first, the polymerization of olefin hydrocarbons to produce alkyl substituents to the alkyl aromatic sulfonates; second, the alkylation of an aromatic hydrocarbon with the polymers of the first step; and third, the sulfonation of the alkyl aromatic hydrocarbons produced in the second step. The first step produces two types of polymers, depending upon the hydrocarbon feed to the polymerization reaction. The two types of polymers are dimers and co-dimers. If the hydrocarbon feed contains only straight-chain mono-olefin hydrocarbons of a single molecular weight such as $C_6$, then the product would be a $C_{12}$ hydrocarbon which is the dimer of the $C_6$. On the other hand, if the hydrocarbon feed contains, for example, three straight-chain mono-olefin hydrocarbons of different molecular weights and each having 5 to 12 carbon atoms such as a hydrocarbon feed containing $C_5$, $C_6$, and $C_7$ hydrocarbons, then the product would contain not only true dimers of each of the feed hydrocarbons but also their co-dimers. The products of such a hydrocarbon feed may be represented as $(C_5)_2$, $(C_6)_2$, $(C_7)_2$, $(C_5 \cdot C_6)$, $(C_6 \cdot C_7)$, and $(C_5 \cdot C_7)$, with the first three being the true dimers of the $C_5$, $C_6$, and $C_7$ feed hydrocarbons and the latter three being the co-dimers of these feed hydrocarbons. Dimerization is then the condensation, one with another, of two like olefin molecules or monomer units while co-dimerization is the condensation, one with another, of two unlike olefin molecules or monomer units. The second step of the present invention, the alkylation step, produces alkyl aromatic hydrocarbons having these dimers and/or co-dimers as alkyl substituents thereto. Alkylation of aromatic hydrocarbons with these dimers and/or co-dimers may be carried out by conventional, well known methods. The third step in the process of the present invention is the sulfonation of the alkyl aromatic hydrocarbons produced by the second step. Sulfonation, also, may be carried out by any of the conventional and well known techniques. Intermediate between these three steps are such incidental but necessary actions as distillation, neutralization, etc. These intermediate actions are readily within the ability of anyone skilled in the art and the methods are not critical and are well known.

To further describe and to illustrate the present invention, the following examples are presented. These examples are not, however, to be construed in any manner as limiting the application, conditions, or objects of the present invention.

EXAMPLE I

Approximately 2.4 moles of 2-hexene were placed in an evacuated autoclave with approximately 24 grams of a catalyst containing 82.6 percent by weight $SiO_2$, 11.8 percent by weight $Al_2O_3$, and 5 percent NiO. The catalyst was activated by heating in air at 500° C. to 600° C. for 12 hours. The olefin-catalyst mixture was stirred for approximately 6 hours. During this period the reaction mass was maintained at a temperature of 155 to 175° C. The reaction pressure was initially atmospheric but was allowed to rise autogenously. At the completion of the reaction period, agitation was stopped and the liquid separated from the catalyst by decantation. The recovered liquid was then subjected to distillation and separated into three fractions. The first fraction represented 38.2 weight percent of the recovered liquid and was unreacted hexenes. The second fraction was a $C_{12}$ or hexene dimer fraction and represented 40.6 weight percent of the recovered liquids, and the third fraction was principally hexene trimer and tetramer and represented 21.2 weight percent of the recovered liquids. The hexene dimer fraction constituted 65.7 weight percent of the polymerized product.

EXAMPLE II

The $C_{12}$ or hexene dimer fraction obtained in Example I was used to alkylate benzene by adding the $C_{12}$ fraction dropwise to dry benzene which had been previously saturated with gaseous HCl and to which had been added aluminum chloride. The mixture was agitated throughout the addition. The ratio of aluminum chloride to benzene was 0.013:1 and the ratio of the $C_{12}$ fraction to benzene was 0.39:1. The reaction mixture was maintained at a temperature of approximately 35 to 37° C. throughout the addition of the $C_{12}$ material. After completion of the addition of the $C_{12}$ hydrocarbons, agitation of the mixture was continued until reaction was complete. The reaction mass was then allowed to settle into two layers, an alkylated layer and a catalyst complex layer. The alkylated layer was recovered and washed twice with equal volumes of water and then fractionally distilled to recover the $C_{12}$ alkylbenzene fraction. This fraction represented approximately 75 weight percent of the alkylate layer.

Sulfonation was then begun by charging alkylbenzene from the fractional distillation to a sulfonation vat. A glass container was used. The temperature was lowered to approximately 10 to 15° C. by means of an ice bath and then 20 percent oleum was added dropwise with constant agitation. The amount of oleum added was approximately 1¼ times the weight of the $C_{12}$ alkylbenzene. The temperature was maintained at 20° C.±5° C. throughout the addition of the oleum. After completion of the oleum addition, the agitation was increased in intensity and the temperature raised and maintained for one hour at 40° C.±2° C. At the end of the hour, water was added to quench the reaction with the temperature being kept below 60° C. The agitation was stopped and the mixture was allowed to separate into two layers. The upper layer was recovered and neutralized with 50 percent sodium hydroxide. The product thus obtained was the alkylbenzene sulfonate prepared from the dimer of 2-hexene.

EXAMPLE III 2-hexene was dimerized at a temperature of 150° C. in the same manner as set out in Example I with the exception that the catalyst was an acid clay designated as K10SF–23 from Sud-Chemie A.G., Munich, Germany. This catalyst is an acid-treated montmorillonite having a composition of 50 to 70 percent silica, 15 to 20 percent alumina, 3 to 5 percent $Fe_2O_3$, 1 to 3 percent CaO, and 1 to 3 percent MgO. The recovered 2-hexene dimer product represented a conversion of 34.6 percent.

EXAMPLE IV

Approximately 3.0 moles of 2-heptene were placed in an evacuated autoclave with approximately 26 grams of a silica-alumina catalyst. The catalyst contained 87 percent by weight $SiO_2$ and 13 percent by weight $Al_2O_3$ and was activated by heating in air at 500 to 600° C. for 12 hours. The olefin-catalyst mixture was stirred for approximately 6 hours. During this period the reaction mass was maintained at 130 to 140° C. The reaction pressure was initially atmospheric but was allowed to rise autogenously. At the completion of the reaction period, the liquid was separated from the catalyst by decantation. The recovered liquid was then subjected to distillation and separated into three fractions. The first fraction represented 47.2 weight percent of the recovered liquid and was unreacted heptenes. The second fraction was the heptene dimer product and represented 34.5 weight percent of the recovered liquids, and the third fraction was principally heptene trimer and tetramer and represented 18.3 weight percent of the recovered liquids. The heptene dimer fraction, which constituted 65.3 weight percent of the polymerized product, had a boiling range of 94 to 105° C. at mm. Hg.

EXAMPLE V

The $C_{12}$, 2-hexene dimer fraction from Example III and the 2-heptene dimer from Example IV were subjected to reaction with benzene to form an alkylbenzene which was then in turn sulfonated to form an alkylbenzene sulfonate. The methods of alkylation and sulfonation were the same as those of Example II.

EXAMPLE VI

Approximately 1.5 moles of 2-hexene and 1.5 moles of 2-octene were placed in an evacuated autoclave with approximately 45 grams of a commercial, synthetic silica-alumina catalyst. The silica-alumina catalyst was one containing 87 percent by weight $SiO_2$ and 13 percent by weight $Al_2O_3$. The catalyst was activated by heating in air at 500 to 600° C. for 12 hours. Next, the olefin-catalyst mass was agitated for approximately 4 hours during which time the reaction mass was maintained at a temperature of 146 to 150° C. The reaction pressure was initially atmospheric but was allowed to rise autogenously. At the completion of the reaction period, agitation was stopped and the liquid separated from the catalyst by decantation and then subjected to distillation to remove the unreacted $C_6$ and $C_8$ mono-olefin hydrocarbons. The remaining liquid product, representing a yield of 59.7 percent was then analyzed by low-voltage mass spectrometry with the following results:

| Mono-olefin: | Weight percent of product |
|---|---|
| $C_{11}$ | 3.4 |
| $C_{12}$ | 13.1 |
| $C_{13}$ | 1.1 |
| $C_{14}$ | 32.6 |
| $C_{15}$ | 1.3 |
| $C_{16}$ | 13.9 |
| $C_{15+}$ | 34.6 |

The $C_{12}$ and $C_{16}$ fractions above represent true dimers, the $C_{12}$ being the dimer of the 2-hexene and the $C_{16}$ being the dimer of the 2-octene. The $C_{14}$ fraction, however, could be produced only by the combination of a 2-hexene molecule with a 2-octene molecule and is thus a co-dimer. Trimerization or co-trimerization products are found in the $C_{16+}$ portion of the polymer product. The $C_{11}$, $C_{13}$ and $C_{15}$ fractions very probably represent the products "cracking back" and disproportionation of $C_{12}$, $C_{14}$, $C_{16}$ and $C_{16}$ plus fractions.

EXAMPLE VII

The product obtained in Example VI was fractionated and a $C_{12}$ to $C_{16}$ fraction recovered. This $C_{12}$ to $C_{16}$ fraction was subjected to reaction with benzene to form an alkylbenzene which was subsequently sulfonated to produce alkylbenzene sulfonates. The methods used for alkylation and sulfonation were the same as used in Example II.

EXAMPLE VIII

To illustrate the biodegradability of these alkylbenzene sulfonates prepared according to the process of the present invention, alkylbenzene sulfonates prepared in Examples II and V were compared with an alkylbenzene sulfonate prepared from propylene tetramer by the method of Example II. The propylene tetramer was obtained by the polymerization of propylene over a phosphoric acid catalyst as set out in U.S. Patent No. 2,057,433. In comparing the conventionally-prepared propylene tetramer containing alkylbenzene sulfonate with the alkylbenzene sulfonates prepared according to the present invention, the "River Water Test" was applied. This test is a comparison type test and as such is indicative of the relative rates of biological decomposition of any number of different compounds being tested. The specific river water used is not critical but due to the variance of type of bacteria in river water and the day-to-day differences in bacterial concentration, portions of the same river water sample should be used for all comparison tests. The "River Water Test" comprises mixing 5 to 10 parts per million of alkylbenzene sulfonates with a very dilute culture of soil organisms contained in a sample of river water, and then periodically determining the alkylbenzene sulfonate content of the river water. The concentration of alkylbenzene sulfonate in the river water is determined by the methylene blue test, which comprises introducing methylene blue into a sample of the alkylbenzene sulfonate containing river water, thereby producing a salt of the alkylbenzene sulfonate with the methylene blue. This salt is then extracted with an organic solvent such as chloroform and the solution color measured. The methylene blue analysis used herein is described in The Analyst, vol. 62, 826–27 (1957). The rate and amount of the reduction of concentration of alkylbenzene sulfonate in the mixture is a comparative measure of its susceptibility or, conversely, resistance to bacterial attack.

A sample of river water was obtained and separated into two equal portions, each in a separate vessel. To one of these portions was added an amount of the alkylbenzene sulfonate prepared in Example II sufficient to bring about a concentration of 7.0 parts per million of the alkylbenzene sulfonate in the river water. To the other portion of the river water was added the dodecylbenzene sulfonate prepared from propylene tetramer obtained from the conventional phosphoric acid polymerization of propylene. The amount of this conventional dodecylbenzene sulfonate added was sufficient to bring about a concentration of 8.4 parts per million of the conventional dodecylbenzene sulfonate in the river water. The concentration of the alkylbenzene sulfonates in the river water was then determined at 0, 10, and 20 days. This comparison was then repeated with one of the alkylbenzene sulfonates prepared in Example V. The following table summarizes the data thus obtained. The alkylbenzenes in the table are described according to the example in which they were prepared and the olefin fraction used in the preparation.

| Alkylbenzene Sulfonate | Concentration in p.p.m. | | | | |
|---|---|---|---|---|---|
| | 0 days | 10 days | 20 days | 30 days | 50 days |
| $C_3$-tetramer derived | 6.8 | 5.3 | 1.8 | 1.6 | 1.6 |
| Example II (derived from Ex. I) | 6.8 | 4.5 | 0.7 | 0.6 | 0.5 |
| $C_3$-tetramer derived | 6.8 | 5.8 | 2.5 | 2.0 | 1.8 |
| Example V (derived from Ex. III) | 7.0 | 4.1 | 0.5 | 0.4 | 0.3 |

EXAMPLE IX

To illustrate the biodegradability of the alkylbenzene sulfonate prepared in Example VII, the "Sludge Effluent Test" was used. This test is identical to the "River Water Test" with the exception that an effluent from an activated sludge sample is used to provide the bacteria rather than the river water. More specifically, a sample of sludge is obtained from an activated-sludge sewage disposal plant. This sludge sample is fed nutrients at approximately 24 hour intervals. The sample is maintained at room temperature and under normal lighting conditions and is continuously agitated by a stream of air introduced near the bottom of the sludge receptacle. The liquid effluent decanted from such a culture after settling is then used in exactly the same manner as the river water in the "River Water Test" described in Example VIII.

The following table gives the results of this test in comparing dodecylbenzene prepared from propylene tetramer as described in Example VIII with the alkylbenzene sulfonate prepared in Example VII.

| Alkylbenzene Sulfonate | Concentration in p.p.m. | |
|---|---|---|
| | 0 days | 10 days |
| $C_3$-tetramer derived | 5.9 | 5.5 |
| Example VII (derived from Ex. VI) | 4.9 | 3.0 |

From the above Examples VIII and IX, it becomes readily apparent that the alkylbenzene sulfonates prepared in accordance with the herein-disclosed invention are substantially more susceptible to biological decomposition than those prepared in the conventional manner as derivatives of propylene tetramer.

The present invention is further illustrated by the preparation of an alkyl aromatic sulfonate using as the aromatic hydrocarbon toluene and as the alkyl substituent thereto, a $C_{12}$ fraction obtained by the dimerization of 1-hexene over a catalyst comprised of 87 percent by weight silica, 12 percent by weight alumina, and 1 percent by weight nickel oxide. The alkyl aromatic sulfonate thus prepared is significantly more susceptible to biological decomposition than those of comparable molecular weights prepared according to conventional known methods.

The invention is still further illustrated by other examples wherein naphthalene, mixed xylenes, ortho-xylene, meta-xylene, para-xylene, ethylbenzene, methylnaphthalene, ethylnaphthalene, or di-methylnaphthalene is used in place of the benzene recited in Examples II, V and VII.

In preparing the alkylbenzene sulfonates according to the present invention, it is necessary as a first step to dimerize and/or co-dimerize straight-chain mono-olefin hydrocarbons. The feedstocks which may be used in this first step to the present invention are those consisting essentially of straight-chain mono-olefin hydrocarbons, either alpha-olefins or internally unsaturated olefins. Such feedstocks may contain only one of such hydrocarbons or may contain two or more of such hydrocarbons of the same or different molecular weights. It is preferred that the straight-chain mono-olefin hydrocarbons contain 5 to 12 carbon atoms and more preferred that they have 5 to 10 carbon atoms. These feedstocks should contain no greater than 10 weight percent of branched-chain mono-olefin hydrocarbons. It is preferred, however, that no branched-chain mono-olefin hydrocarbons be present in the feed. Also, it is preferred that there be no acetylenes or diolefin hydrocarbons as impurities in the feed. Saturated hydrocarbons, e.g., paraffins, have little or no deleterious effect on the present invention, and, therefore, their concentration in the feed is not critical to the operation of the present process. However, excessive amounts of saturated hydrocarbons should be avoided from a practical standpoint since they are merely "dead weight" to the process. Examples of the straight-chain mono-olefin hydrocarbons to which the present invention is specifically directed are 1-pentene, 2-pentene, 1-hexene, 2-hexene, 3-hexene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, 5-decene, etc., up to and including 6-dodecene. The number of straight-chain mono-olefin hydrocarbons of different molecular weights which may be present in the hydrocarbon feed is immaterial, but generally, for simplicity of operation, it is preferred, if more than one be present, to have not more than 5 straight-chain mono-olefin hydrocarbons of different molecular weights in the mixture. The hydrocarbons of a particular molecular weight included within the hydrocarbon feed mixture may be any or any mixture thereof of the double bond isomers of that molecular weight which is within the generic description of the preferred feeds subject to the limitations hereinbelow set forth in regard to catalysts. For example, a feed containing $C_6$ and $C_8$ straight-chain mono-olefin hydrocarbons may include 1-hexene, 2-hexene, 3-hexene, or any mixture thereof as the $C_6$ hydrocarbons and 1-octene, 2-octene, 3-octene, 4-octene, or any mixture thereof as the $C_8$ hydrocarbons.

The catalysts which may be used in bringing about this dimerization and co-dimerization of the straight-chain mono-olefin hydrocarbons according to the practice of the first step of the present invention may be broadly classed as those containing silica and alumina, magnesia, titania, or zirconia. These catalysts may be those containing only silica and alumina, magnesia, titania, or zirconia or they may contain, in addition, various metal oxides as polymerization promoters. Non-limiting examples of catalysts within the scope of the present invention are such catalysts as silica-alumina, silica-magnesia, silica-titania, and silica-zirconia catalysts containing 1 to 99 percent by weight silica and the remainder alumina, magnesia, titania, or zirconia and inert materials, silica-alumina, silica-magnesia, silica-titania, silica-zirconia catalysts containing 0.001 to 15 percent by weight of one or more metal oxide promoters, naturally-occurring silica and alumina containing acid clays such as kaolin, montmorillonite, floridin, etc. Metal oxide promotors which may be used with these catalysts are the oxides of metals from Groups IA, IIA, IVB, VB, VIB, VIII, IB, IIB, and IIIA of the Periodic Table. Somewhat more preferred catalysts for causing the dimerization and co-dimerization of the straight-chain mono-olefin hydrocarbons in accordance with the present invention are catalysts consisting essentially of silica and alumina in a weight ratio of 1:10 to 10:1 of silica to alumina and also having included as a portion thereof one or more metal oxides selected from the group consisting of lithium, sodium, potassium, rubidium, cesium, calcium, titanium, vanadium, chromium, molybdenum, manganese, iron, ruthenium, cobalt, nickel, palladium, platinum, copper, silver, zinc, cadmium, mercury, and gallium. Still more preferred are those catalysts which consist essentially of silica and alumina in a weight ratio of 1:3 to 8:1 of silica to alumina and silica-alumina catalysts having this weight ratio of silica to alumina but also containing 0.001 to 10 percent by weight of a metal oxide promoter selected from the group consisting of the oxides of lithium, potassium, nickel, copper, and gallium. Also among the preferred catalysts are the natural-occurring acid clays previously mentioned, kaolin, montmorillonite, and floridin.

One important limitation on the choice of catalysts for use in the process of the present invention is in regard to the feed used. If the feed is one comprising internally unsaturated mono-olefins, then any of the above defined catalysts may be used. However, if the feed is one consisting essentially of straight-chain alpha-olefins, then the catalyst used is one of the above-described metal oxide promoted silica-alumina catalysts.

The temperatures at which dimerization and co-dimerization of the straight-chain mono-olefin hydrocarbons may be effectively carried out may range from 50 to 250° C. A somewhat more preferred temperature range, however, is to be found from approximately 100 to 200° C. Temperatures for optimum results will vary considerable with the different dimerization and co-dimerization catalysts which are within the scope of the present invention and also the optimum temperatures will vary with feed-stocks, method of contact, pressures, etc. Determination of optimum temperatures within the above ranges are readily within the ability of those skilled in the art, however.

Pressures wherein the process of the first step of the present invention is operable may range from atmospheric to 2000 p.s.i. However, it is preferable to utilize pressures of approximately atmospheric to 500 p.s.i. It is still more preferred to operate at pressures of atmospheric to 300 p.s.i. and still more preferable to operate at or near atmospheric pressure, with the highest pressure attained being in the sum of the partial pressures of the components of the system at the conditions of temperature at which the reaction is being carried out.

The method whereby the straight-chain mono-olefin hydrocarbon feed is contacted with the catalyst is not particularly critical in the present invention. Any method insuring thorough contact between the catalyst and the feed hydrocarbons may be used. If batch type contacting is used, the length of time of contact may vary as widely as 0.1 to 24 hours with the optimum contact time being dependent on such things as the specific catalyst used, the feedstocks, temperatures, efficiency of contact, etc. Optimum contact times may be readily determined by anyone skilled in the art by application of the teachings herein presented concerning the other process variables of the present invention. When and if it is preferred to have a continuous process using the present invention, space velocities of the reactants will become of some importance but may be readily determined by those skilled in the art and having knowledge of the temperatures and pressures, feedstocks, etc., given herein. Generally, however, space velocities will range within 0.01 to 10.0 pounds of liquid feed per hour per pound of catalyst. In many instances, prior polymerization art may provide a guide for the determination of space velocity ranges for certain of the catalysts operable in the present invention. Length of contact time, whether in a continuous or batch type process will generally have little effect on the structure of the product.

The present invention may be utilized for the preparation of alkyl aromatic sulfonates in which the aromatic portion is any aromatic or alkyl aromatic hydrocarbon having alkyl side chains of a length such that they will not destroy the detergent properties of the alkyl aromatic sulfonate. The aromatic nucleus may be benzenoid or naphthalenoid. The substituents to the aromatic nucleus should not contain more than 4 carbon atoms each and there should be no more than 4 of such alkyl substituents to the aromatic nucleus. Several non-limiting examples of aromatic hydrocarbons other than benzene which may be alkylated and sulfonated according to the present invention to produce alkyl aromatic sulfonates which are susceptible to biological decomposition are the following: naphthalene, toluene, o- m- and p-xylenes, ethylbenzene, methylnaphthalenes, ethylnaphthalenes, dimethylnaphthalenes, etc.

The products formed by the dimerization and co-dimerization of straight-chain mono-olefin hydrocarbons and discussed above may be used in the alkylation of benzene, either individually or in fractions containing two or more products. In instances where the product carbon number distribution is such that two or more carbon atoms separate each dimer and/or co-dimer product, it may be desired to use only an individual compound of a desired molecular weight due to the relative ease with which such widely spaced products may be separated by distillation, or it may be desired to use mixtures of different molecular weight products. In instances where the different products are separated by only one carbon atom, fractions containing two, three, or four different products will probably be more generally used though, if desired, the fractions may be separated into component parts and these used for alkylation. Since all of the products of the union of two molecules or monomer units formed by the dimerization and co-dimerization of straight-chain mono-olefin hydrocarbons of 5 to 12 carbon atoms in accordance with the present invention will form alkylbenzene sulfonates susceptible to biological decomposition, then they may be utilized equally well whether as individual compounds or as fractions containing two or more of such compounds.

The dimers and co-dimers of the straight-chain mono-olefin hydrocarbons, once obtained, must then be reacted with benzene to form an alkylbenzene. This may be accomplished, with not necessarily equivalent but with adequate results, by using any of the catalysts and methods presently known to the art and is not critical in the present invention. The method used in Example II is somewhat preferred, however, it being very practical and one which gives very satisfactory results.

The sulfonation of the alkylbenzene to produce an alkylbenzene sulfonate also follows conventional and well known methods. As in the case of the alkylation step of the present invention, abundant prior art exists as to the sulfonation of alkylbenzenes to produce alkylbenzene sulfonate detergents. Any of the methods of the prior art may be utilized, not necessarily with equivalency, but with adequate results. Generally, however, the method set forth in Example II is somewhat preferred, it being a conventional and well known method and one which gives very satisfactory results.

We claim:
1. A process for the preparation of biodegradable alkyl aromatic sulfonates which comprises contacting a hydrocarbon feed consisting essentially of straight-chain monoolefin hydrocarbons having 5 to 12 carbon atoms with a silica-alumina catalyst having a weight ratio of silica to alumina of 1:10 to 10:1 and containing 0.001 to 15 percent by weight of a metal oxide promoter, said metal oxide promoter being selected from the group consisting of the oxides of lithium, potassium, nickel, copper, and gallium, at a temperature of 50 to 250° C. and at a pressure of atmospheric to 2000 p.s.i., thereby forming a product containing substantial amounts of polymers formed by the condensation of two molecules of the feed hydrocarbons and having numbers of carbon atoms equal to the sum of the carbon atoms contained in any two straight-chain mono-olefin hydrocarbon molecules within the hydrocarbon feed, and thereafter subjecting said product to distillation and recovering therefrom a fraction containing the polymers formed by the condensation of two straight-chain mono-olefin molecules, and then subjecting said fraction to alkylation conditions in the presence of an aromatic hydrocarbon and a suitable alkylation catalyst, thereby producing alkyl aromatic hydrocarbons containing as the alkyl substituents the polymers formed by the union of two straight-chain monoolefin hydrocarbon molecules, and thereafter subjecting the alkylaromatic hydrocarbons to sulfonation, thereby producing alkyl aromatic sulfonates.

2. The process of claim 1 wherein the hydrocarbon feed is contacted with the catalyst at a temperature of 100 to 200° C. and a pressure of atmospheric to 500 p.s.i.

3. The process of claim 1 wherein the weight ratio of silica to alumina is 1:3 to 8:1.

4. The process of claim 1 wherein the amount of said metal oxide promoter present in said silica-alumina catalysts is 0.001 to 10 percent by weight of the catalyst.

5. The process of claim 1 wherein the straight-chain mono-olefin hydrocarbons in said hydrocarbon feed have 6 to 10 carbon atoms per molecule.

6. The process of claim 1 wherein said straight-chain mono-olefin hydrocarbons are alpha-olefins.

7. The process of claim 1 wherein said straight-chain mono-olefin hydrocarbons are internally unsaturated olefins.

8. The process of claim 1 wherein the aromatic hydrocarbon is benzene.

References Cited
UNITED STATES PATENTS

| | | | |
|---|---|---|---|
| 2,825,721 | 3/1958 | Hogan et al. | 260—88.1 |
| 3,188,360 | 6/1965 | Gudelis | 260—505 |

LORRAINE A. WEINBERGER, *Primary Examiner.*

M. WEBSTER, *Assistant Examiner.*